(12) United States Patent
Castro et al.

(10) Patent No.: US 9,196,103 B2
(45) Date of Patent: Nov. 24, 2015

(54) ENTRY TECHNOLOGY FOR BUILDING AUTOMATION

(71) Applicant: International Business Machines Corporation, Armonk, NY (US)

(72) Inventors: Rodrigo C. Castro, Campinas (BR); Breno H. Leitão, Jardim Guanabara Campinas (BR); Mahdad Majd, Rochester, MN (US); Thiago C. Rotta, Catanduva (BR)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/754,824

(22) Filed: Jan. 30, 2013

(65) Prior Publication Data

US 2014/0210590 A1  Jul. 31, 2014

(51) Int. Cl.
*G05B 19/00* (2006.01)
*G07C 9/00* (2006.01)

(52) U.S. Cl.
CPC .................. *G07C 9/00563* (2013.01)

(58) Field of Classification Search
CPC ........... G07C 9/00158; G07C 9/00087; G07C 9/00111
USPC ............ 340/5.52, 5.8, 542; 713/185; 382/115
See application file for complete search history.

(56) References Cited

U.S. PATENT DOCUMENTS

| | | | |
|---|---|---|---|
| 5,774,039 A | 6/1998 | Housley | |
| 7,111,174 B2 * | 9/2006 | Hamid | 713/186 |
| 7,996,893 B2 | 8/2011 | Persaud-Deolall | |
| 8,266,442 B2 * | 9/2012 | Burke | 713/186 |
| 2009/0072988 A1 | 3/2009 | Haywood | |
| 2010/0161728 A1 | 6/2010 | Drozt | |
| 2011/0302420 A1 | 12/2011 | Davida | |
| 2012/0023151 A1 | 1/2012 | Bennett | |
| 2012/0044050 A1 | 2/2012 | Vig | |
| 2013/0045763 A1 * | 2/2013 | Ruiz | 455/466 |

OTHER PUBLICATIONS

"Smart door bell system," IBM Technical Disclosure, Oct. 13, 2009, IPCOM000188533D.
"The doorbell that tricks burglars into thinking you're home—and the boy, 13, who invented it," The Daily Mail online, downloaded Sep. 11, 2012, http://www.dailymail.co.uk/sciencetech/article-1394448/Doorbell-tricks-burglars-thinking-youre-home-invented-schoolboy-Laurence-Rook-13.html.

* cited by examiner

Primary Examiner — Vernal Brown
(74) Attorney, Agent, or Firm — Anthony V. S. England

(57) ABSTRACT

A computer system accesses identity data providing unique biometric identifications and associated names for respective people. Roles are stored and associating ones of the roles are associated with ones of the people. Rules are stored, wherein each rule is configured to define one of the roles or people and define a condition and an action. The computer system receives from a device at an entryway, biometric data for a person. A named person is indicated for the received biometric data by the identity data accessed by the computer system. The computer system selects a rule corresponding to the identified person or to one of the defined roles for the identified person. The computer system performs the defined action for the selected rule when a current condition satisfies the defined condition for the selected rule.

17 Claims, 5 Drawing Sheets

ENTRY TECHNOLOGY FOR BUILDING AUTOMATION

BACKGROUND

The present invention relates to the field of home automation or, more generally, building automation, which is a field involving the integrating of building control and monitoring devices, such as devices for heating, cooling, lighting, security, food preparation and storage, plant watering, entertainment, pet feeding, etc. The popularity of building automation is increasing due to availability and affordability of control devices and due to standardization of connectivity to computer systems, including smartphones and tablets.

Although reference is made herein to a "home" or, more generally a "residence" controlled by a resident, it should be understood that the disclosure herein may relate still more generally to buildings of all types, including offices, schools, hospitals, stores, etc. controlled by proprietors of all types.

SUMMARY

According to embodiments of the present invention, a method is provided for managing an entryway for a building. The method includes accessing, by a computer system, identity data providing unique biometric identifications and associated names for respective people, storing roles and associating ones of the roles with ones of the people and storing rules, wherein each rule is configured to define one of the roles or people and define a condition and an action.

Further, the method includes receiving, by the computer system from a device at the entryway, biometric data for a person, identifying a named person indicated for the received biometric data by the identity data accessed by the computer system and selecting, by the computer system, a rule corresponding to the identified person or to one of the defined roles for the identified person. The computer system performs the defined action for the selected rule when a current condition satisfies the defined condition for the selected rule.

In another aspect, storing a rule includes storing a rule configured to define that presence of a person in the building is a condition for the rule and the method further includes detecting whether a person is present in the building responsive to a sensor in the building.

In another aspect, storing a rule includes storing an announcement rule configured to define a predetermined time interval during a predetermined day of the week as a condition for the rule, to define a named person, and to define an announcement action for announcing instructions to a visitor at the entryway for the predetermined time interval during the predetermined day of the week. The method further includes performing the defined announcement action by the computer system transmitting the instructions to an audio speaker device at the entryway responsive to selecting the announcement rule.

In another aspect, storing a rule includes storing a rule configured to define at least a first condition that determines when the rule is active and a second condition that determines when the rule is invoked when the rule is active.

In another aspect, storing a rule includes storing a rule configured to be active by default and to be inactive only when configured with a non-default condition.

In another aspect, accessing identity data providing unique biometric identifications and associated names for respective people includes accessing, by the computer system via a network, a database of a service provider defining names, biometric data and roles for respective people acting as agents of the service provider.

In another aspect, the identity data providing unique biometric identifications and associated names for respective people includes local identity data and remote identity data. The computer system accesses the identity data responsive to the computer system receiving biometric data for a person from the device at the entryway. For identifying a named person indicated for the received biometric data the computer system accesses the remote identity data when the local identity data does not identify a named person for the received biometric data.

In other forms of the invention, computer program products and systems are provided.

BRIEF DESCRIPTION OF THE DRAWINGS

Novel features believed characteristic of the invention are set forth in the appended claims. The invention itself, however, as well as a preferred mode of use, further objectives and advantages thereof, will best be understood by reference to the following detailed description of one or more illustrative embodiments when read in conjunction with the accompanying drawings, wherein:

DETAILED DESCRIPTION

Descriptions of various embodiments of the invention are herein presented for purposes of illustration, but are not intended to be exhaustive or limited to the embodiments disclosed. Many modifications and variations will be apparent to those of ordinary skill in the art without departing from the scope and spirit of the described embodiments. Terminology used herein was chosen to best explain the principles of the embodiments, the practical application or technical improvement over technologies found in the marketplace, or to enable others of ordinary skill in the art to understand the embodiments disclosed herein.

Commercially available home security systems can acquire sounds and images and send them to a home security company. Embodiments of the present invention provide technology beyond that, which enables the following:

1. Recognizing who's at a home's door step based on previous biometric identification.
2. Storing biometric information of a stranger.
3. Letting residents know who is ringing the doorbell by using different ring tones for different visitors or by announcing visitor names by speech, for example.
4. Presenting different messages to different visitors at particular entries, such as, for example, instructing the postal carrier, and only the postal carrier, to deliver today's mail next door or instructing the newspaper delivery person where to put the newspaper.

5. Recognizing the "role" of a person based on pre-defined rules (i.e., this is an identified mail carrier, an identified pizza delivery person, an identified drugstore delivery person, my neighbor, a police officer), which may be based on biometric information made available by private or public trusted sources, or may be based on self-collected information.
6. Denying access to the interior of the residence (locking up, dialing 911) if a threatening person is ringing the bell, such as, for example, a known fugitive from the law.
7. Storing a visitor log entry indicating names, dates and times of day.
8. Recording voice messages at entries and presenting them to the resident for later review, such as "Hey, it's the mail carrier; I've tried to deliver you a package from DealExtreme which is now available for your pick up at the station on 3334 Main Street. Office hours from 8:00 a.m. to 5:00 p.m."
9. Patching an entry request, such as a doorbell ring, to the resident via voice over Internet protocol (VOIP) based upon detecting conditions and determining that the conditions meet pre-established rules.

In order to accomplish the above, hardware and rule-and-role-based algorithms are provided as described in the following.

Figure 1:
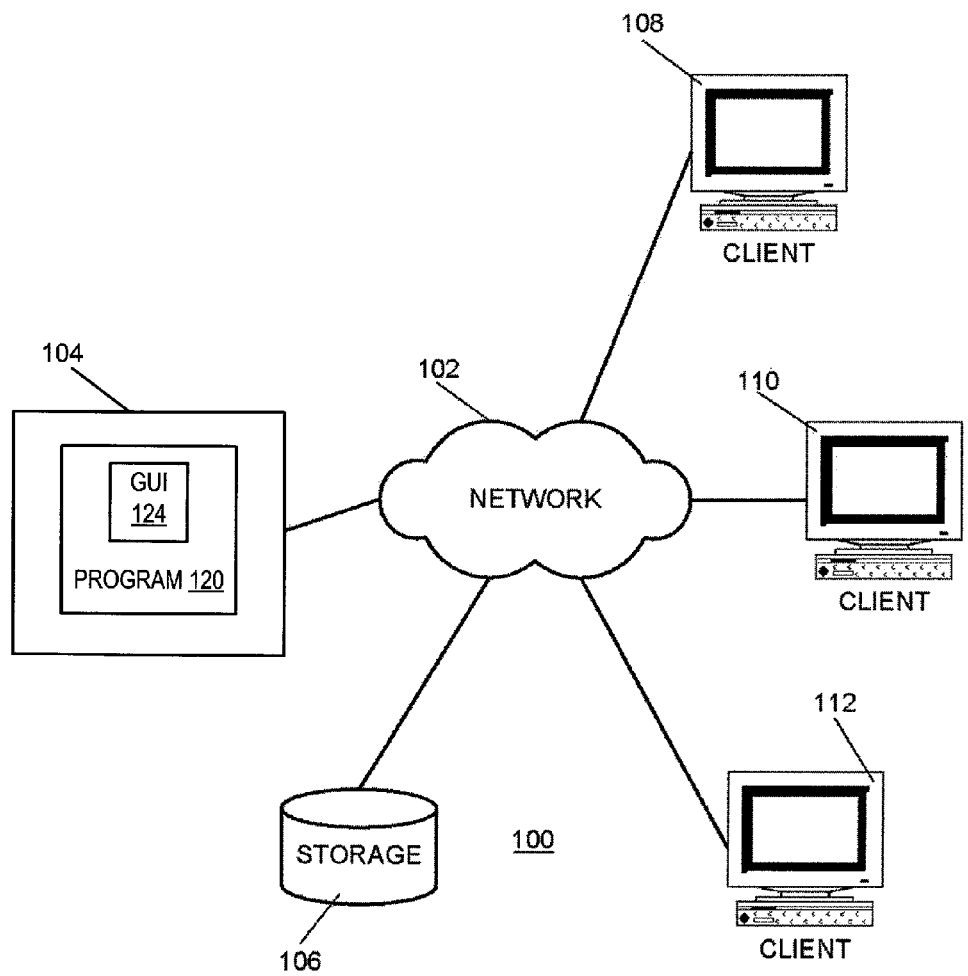
FIG. 1 depicts a pictorial representation of a network of data processing systems in which embodiments of the invention may be implemented.

Referring now to FIG. 1, a pictorial representation of a network of data processing systems (also referred to as "computer systems") is depicted in which embodiments of the invention may be implemented. Network data processing system 100 is a network of computer systems in which embodiments of the invention may be implemented. Network data processing system 100 contains a network 102, which is a medium used to provide communications links between various devices and computers connected together within network data processing system 100. Network 102 may include connections, such as wire, wireless communication links, or fiber optic cables.

In the depicted example, one of the computer systems, server 104, is connected to network 102 along with storage unit 106. In addition, other computer systems, clients 108, 110, and 112, are depicted and are connected to network 102. These clients 108, 110, and 112 may be, for example, personal computers, network computers, tablet computers, smart phones, etc. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network 102 includes a local area network and may include the Internet, which has a worldwide collection of networks and gateways that use the Transmission Control Protocol/Internet Protocol (TCP/IP) suite of protocols to communicate with one another. The Internet includes a backbone of high-speed data communication lines between major nodes or host computers, consisting of thousands of commercial, government, educational and other computer systems that route data and messages.

System 100 includes computer program 120 which provides security and other features described herein and is shown on computer system 104 in FIG. 1. In one aspect, program 120, for example, provides a graphical user interface (GUI) 124 to a current user. It should be understood that program 120 may be a program running on a different system, such as system 108, and may be more than one program running on more than one system. However, program 120 may be referred to hereinafter in the singular. Various configurations will be apparent in certain instances according to the context of descriptions herein, although the configurations described and illustrations such as FIG. 1 are intended as examples for embodiments of the invention, and not as architectural limitations beyond what are recited in claims herein below.

Figure 4:
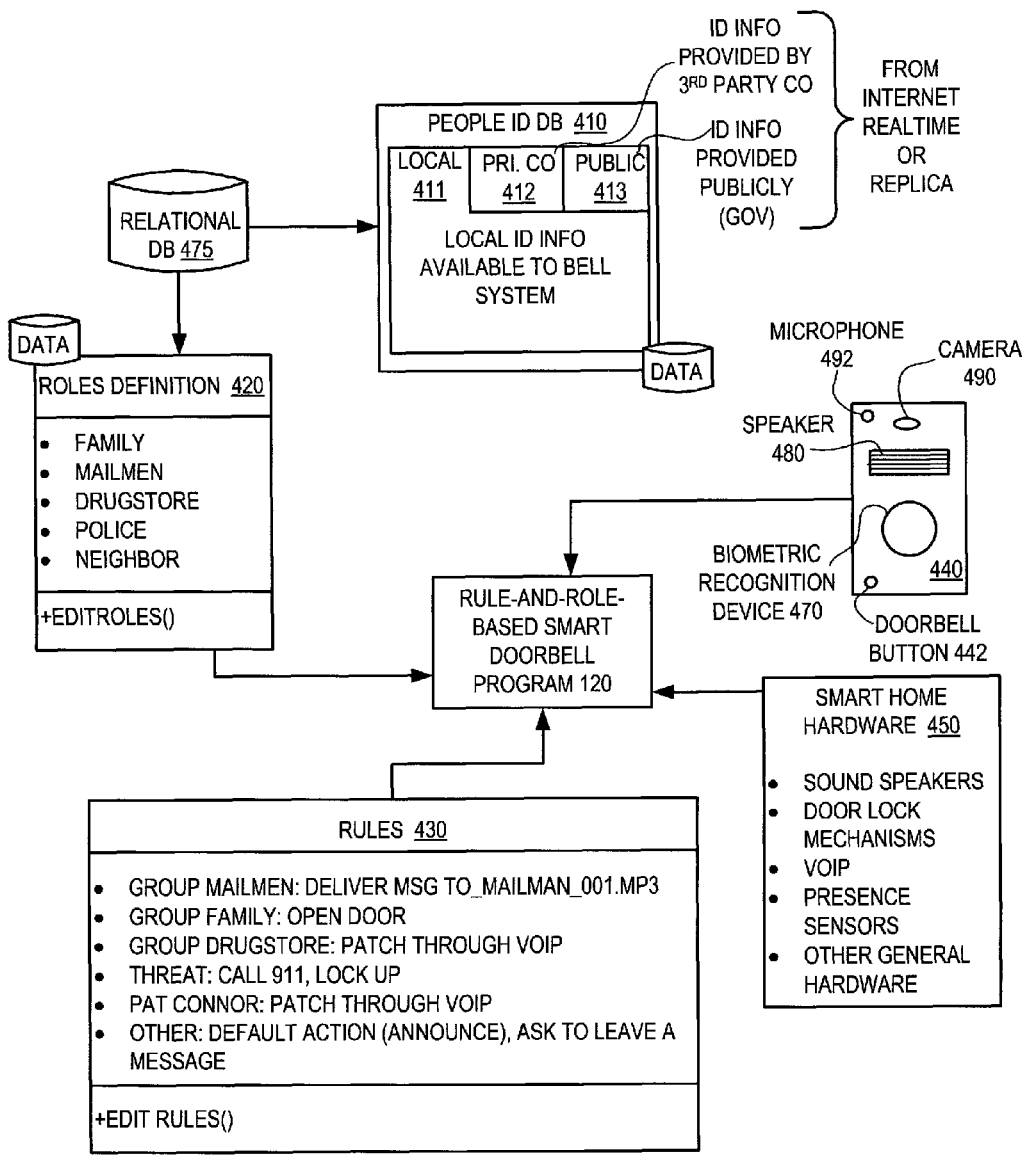
FIG. 4 is an exemplary diagram illustrating logical elements for a smart entry system, according to one or more embodiments of the invention.

Aspects of a rule-and-role-based security system 400 are illustrated in FIG. 4, which may include aspects of FIG. 1, according to embodiments of the invention. System 400 includes a security program 120 running on a computer system 104 providing a graphical user interface (GUI) 124 to a user. Program 120 may provide a web interface accessible from computer system 104 running program 120, so that the resident may access and control program 120 via an IP address from a device such as a smart phone through the World Wide Web.

Computer system 104 program 120 receives inputs from doorbell button 442, camera 490, microphone 492 and biometric recognition device 470 and transmits outputs to speaker 480, which are shown on entry device 440, according to an embodiment of the present invention. Entry device 440 is located proximate to a door or gate to a residence, for example, which enables the resident and program 120 to interact with a visitor at a door of the residence.

Biometric recognition device 470 typically includes a sensor, a processor, a memory and a program stored therein and a display. That is, in various embodiments, respective biometric recognition device 470 provides one or more sensors, such as fingerprint reader or camera, and a program for processing of data collected by the sensors. (Other technologies for biometric identification not explicitly described herein are within the knowledge of one of ordinary skill in the art and may be within the scope of the present invention.

Computer system 104 program 120 also receives input from and transmits output to other hardware 450 of the residence, as shown, which may include sensors for motion, temperature, light, etc., and from other devices, including keyboards/keypads, displays, door locks appliances, etc. Sensors may be used to detect presence of persons in the residence. Speakers may be spread throughout the residence and connected (not necessarily in an exclusive fashion) to program 120, so that program can send audible messages throughout the residence via the speakers announcing that an identified person is at the entry device 440. As another example, program 120 may control locking mechanisms to lock and unlock doors or gates. Other combinations can be made with other smart home hardware.

In a standardized smart home automation arrangement, hardware 440 and 450 announces its capabilities once it is connected to system 400. Then system 400, including program 120, makes these capabilities available to configure use. For example, if a VOIP system is connected to system 400, then program 120 allows the user to create rules that use the VOIP subsystem. If the VOIP system is not connected to program 120, then this feature is not presented for use/programming of a rule.

A people ID database 410 as in FIG. 4 provides biometric data, according to embodiments of the invention, for individual persons that can uniquely identify the persons, which may include identification of a person's name and one or more of a fingerprint pattern, facial pattern, eye pattern, voice pattern or others of the person that provide unique personal identification. In the future, new biometric technology may be invented to quickly identify a person. For example, a DNA scan may become quick and inexpensive enough to use for a security application such as in embodiments of the present invention. Although not available today, this should not be a limitation of the present invention.

Biometric data of database 410 may be provided by a variety of data from a variety of sources, including self-collected biometric database 411, i.e., collected by system 400, private databases 412 and publicly accessible databases 413. Databases 411-413 may be accessed in a variety of ways and may be remote or local and may be distributed, such as among computers 104, 108, etc. shown in FIG. 1 and others.

Public databases 413 may be provided by, for example, by a governmental entity with a purpose of identifying people. These databases 413 tend to limit the identification of a person who matches a biometric pattern to the name of the matching person. That is, databases 413 tend to provide no other information about a matching person, such as where he/she works or lives, phone number, etc. In embodiments of the present invention, database 413 may provide a limited identification as a last resource for identifying someone, i.e., in case system 400 fails to identify a person from local stored data 411 and from third party data 412.

Public databases 413 have authenticity certified by the government and are accessible only by a safe, secure connection in a similar manner as for accessing Internet banking, in embodiments of the present invention. In embodiments, databases 413 have a hierarchical structure including, for instance, town databases that are children of county public databases that are children of state public databases that are children of a nation's database. Databases 413 may be a joint private-government entity effort, which helps enforce security at condominiums, hotel rooms, hospital rooms and other places where a doorbell is usually present. They are updated constantly and may be populated in part with biometric data of foreigners visiting a country, wherein a governmental agent may collect and store their biometric data upon their arrival at immigration.

Private databases 412 have some features in common with public databases 413, but present more data about the persons in the database and may offer ID data for a smaller set of people, in embodiments of the present invention. Local biometric database 411 has a higher priority when program 120 searches for someone's ID. If not found locally, program 120 falls back to private databases 412, and then to the public databases 413. In embodiments of the present invention, local identification data 411 is not accessible remotely, so there is no need for authentication at this level.

Program 120 may log people who ring the doorbell via button 442 or who otherwise interact with entry device 440 and who may be identified by system 400 via data 410. The resident (whether in residence or not) can then simply check the log and permanently store identities for persons he/she chooses on the local ID database. Biometric data is stored in data 411 only for persons whom the resident chooses. The resident can elect to store identification locally in data 411 for a person whose identity is available in the private and public databases 412 and 413. This serves two purposes. First, this person will still be identified even during a networking failure (a situation in which system 400 can't talk to the private and public databases 412 and 413). Second, this speeds up identification. In theory, persons who usually visit have the highest probability of visiting again, so it makes sense to store their identity locally, at least for speed purposes.

Roles definitions 420 are a stored data structure that are part of or accessible to program 120 and provide useful features, although persons are identifiable by database 410, which may already identify roles. For example, someone who works in a given role for a given company may be identified by database 410, as described herein above. Roles definitions 420 further define roles and associate the roles with identified people, where the identifications may arise from or may be added to people ID database 410. Roles definitions 420 may be provided by local, relational database 475 managed by program 120, in embodiments of the present invention. Roles definitions 420 defined by a resident identify a custom set of people to whom the resident may wish to eventually deliver a message and take other custom action. So, in essence, the roles definitions 420 match person roles in a customized way and associate actions to them. For example, a resident may define and store a role definition 420 named "drugstore" and associate identified delivery persons who work for a particular drugstore with this role. Once done, whenever any of these identified drugstore employees ring the doorbell, program 120 matches them to their associated "drugstore" role. Program 120 may be configured by rules 430, as described below, so that if a visitor arrives whom program 120 identifies by recognition data from biometric device 470 and identification data 410 and whom program determines from role definitions 420 is a drugstore delivery person, program 120 unlocks the door and transmits a message to speaker 480 stating that the resident has recorded and stored previously, which announces "Hello, please step in and bring me the medicine in my room."

As previously mentioned, private databases 412 may present more data about the persons in the database than public databases 413. For instance, the owner of a pizza delivery chain, "Yummy Pizza," may provide the name of the business entity, "Yummy Pizza," employee names of delivery persons and biometric data for those persons, such that they are associated with the business entity. The resident may program system 400 to announce a visitor identified upon arrival by biometric data collection via device 470 and by comparison to private database 412, including the above mentioned information provided by the owner of the pizza chain, that the visitor is "Mr. Albert from Yummy Pizza" and that the visitor "is at the doorstep." The employee data is provided by Yummy Pizza and is made available to the public in a similar fashion as the public database 413, that is, via authentication certificates and a safe, secure connection. It is the resident, however, that chooses whether or not he/she wants to trust and use this private Yummy Pizza ID database with system 400. An advantage of doing so is that, whenever Mr. Albert changes jobs, Yummy Pizza will update its private ID database 412, so that Mr. Albert will no longer be identified as a Yummy Pizza employee if he visits again. This enforces a degree of safety. Since Mr. Albert is no longer found within the Yummy Pizza private ID database, if he visits again he is matched by the public ID database 413 and not the private Yummy Pizza ID database 412 and will be announced simply as "Mr. Albert." These databases are updated constantly by their holders.

Rules 430 are another stored data structure that are part of or accessible to program 120, which may be active or inactive, may be invoked in program 120. That is, according to embodiments of the present invention, each rule 430 defines at least i) a first condition (an "enabling" condition) that determines when the rule is active, ii) a second condition (an "action" condition) that determines when the rule is invoked if the rule is active, iii) a role or person to which the second condition applies and iv) an action to take when the second condition and role or person match the active rule. In various embodiments, rule 430 may define a set of enabling conditions that must be satisfied to make the rule active, a set of action conditions that must be satisfied to invoke an action for an active rule. More than one action may be invoked by the rule. In various embodiments, rule 430 may be default active, i.e., requiring no enabling condition unless specified otherwise. A rule 430 may define a combination or sequence of enabling or action conditions that must be satisfied to activate the rule or invoke the actions.

A variety of enabling conditions may be defined for rules 430. For example, rules 430 may be defined to apply by time-of-day and calendar-based enabling conditions. A rule 430 may be made always active by defining the enabling condition as any time of day and any day, for example. Alternatively, one enabling condition may be during weekday working hours when there is typically no one home. Another enabling condition may be all other times. One rule 430 may define the weekday working hours as the enabling condition and the associated action for the rule may be to announce to the postal carrier to deliver next door. Another rule may define the non-working hours as the enabling condition and the associated action for the rule may be to just announce to people in the residence that that postal carrier is at the door. Rules 430 may define an enabling condition to apply by presence or absence of people within the residence, which may be detected by motion sensors 450 within the residence or may be determined by program 120 receiving a login from the resident, for example. Rules 430 may be hierarchical in that, if no rule is matched, a default rule applies, which defines a default action. The default action may be to announce a visitor at a door, if system 400 detects that the resident is at home, or else, if the resident is not at home, may be to announce that the visitor may leave a message.

Program 120 receives inputs from biometric recognition device 470, other hardware 450 and other programs and data and performs logical operations, any of which, or a combination of which, may satisfy a condition of a rule 430. Responsive to detecting a condition, program 120 determines from a biometric recognition device 470 and identification data 410 identities of any persons associated with the condition, determines from roles 420 any roles that the identified person satisfies, and invokes any active rules 430 that define the condition for that person or role. Consequently, program 120 execution then causes the corresponding actions for the invoked rules 430.

For example, when a doorbell button 442 signals program 120 (i.e., a doorbell ringing condition), program 120 determines the identity of the person ringing the doorbell from biometric device 470 and data 410. For example, program 120 may identify the person ringing the doorbell in the example instance as John Doe. Next, program 120 checks roles 420 and determines that John Does satisfies a postal carrier role and checks active rules 430 for the doorbell ringing condition and the postal carrier role. In this example instance, program 120 finds an active rule 430 that satisfies the doorbell ringing, action condition and the postal carrier role and that specifies a notification action which causes program 120 to present at the door. As in the example above regarding the drugstore delivery, rule 430 may specify that program 120 cause the system to read a pre-defined message (which the resident may have earlier typed and stored for a particular role 420 or identified person) via speech synthesis and character recognition or via playback of a recorded message (which the resident may have earlier recorded and stored), where the notification is presented via a connection to a speaker by the door where the doorbell is located. Rule 430 may specify that program 120 cause system 400 to present text on a visual display at the door, unlock the door, etc., depending on the action defined by rule 430. As another example, a rule 430 may specify that program 120 cause system 400 to patch microphone and speaker 480 to the resident's cell phone via VOIP shall a particular identified person identified by data 410 or a person having an identified role 420 rings the doorbell.

Figure 5:
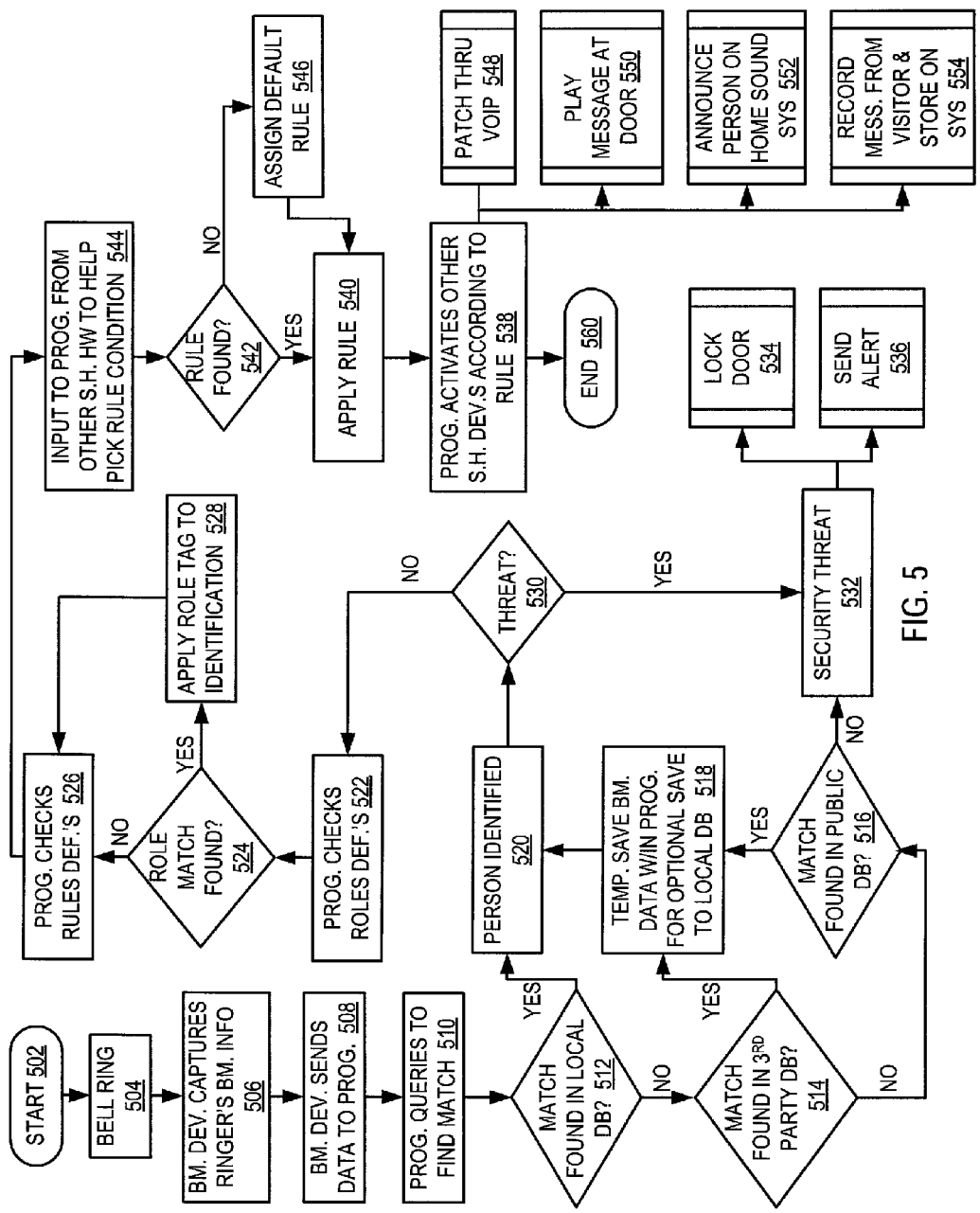
FIG. 5 is an exemplary flowchart illustrating processes, according to one or more embodiments of the invention.

With reference now to FIG. 5, a flowchart is depicted in which embodiments of the invention may be implemented. At 504, a program receives user input from a door bell. At 506, a biometric device captures the user's biometric information. At 508, the biometric device sends data to program 120. At 510, program 120 starts to query databases 410 to find a match. At decision 512, if a match is found in local databases 411, a person is identified at 520. Program 120 then evaluates whether or not the identified person is a threat at 530. If the person is not a threat, program 120 checks role definitions at 522. If program 120 finds a role match at decision 524 it applies a role tag to identification at 528, then checks rules definitions at 526 and proceeds on to receive input from other smart home hardware at 544. If program 120 does not find a role match at decision 524, it bypasses applying a role tag to identification and goes directly to checking rules definitions at 526, then proceeds to receive input from other smart home hardware at 544.

Program 120, at 544, picks a rule (i.e., presence sensors). At decision 542, if program 120 finds a conditional rule, program 120 applies the rule at 540 and activates other smart home devices according to the rule at 538. (In an example illustrated, program 120 causes the smart home devices to patch through voice over IP 548, play a message at the door 552, announce the person on a home sound system 552, and record and store a message from the visitor 554 by program 120.)

At 530, if, program 120 detects the person identified at 520 is a security threat program 120 initiates door locking at 534 and sends an alert, such as to the resident and a private security provider or local police at 536.

If, at decision 542, program 120 does not find a conditional rule, program 120 assigns default rule at 542 and applies it at 520, proceeding on to activate other smart home devices according to the rule at 538.

At decision 512, if a match is not found in local database 411, program 120 queries 3rd party private provider databases 412 at 514. If a match is found at 514 in 3rd party private provider databases 412, then at 518 program 120 temporarily saves biometric data for eventually saving it to local database 411 and next identifies a person at 520.

Returning to decision 514, if no match is found in 3rd party private provider databases 412, then at 516 program 120 queries public database 413. If a match is found in public databases 413, then program 120 proceeds to 518, temporarily saving biometric data for eventually save it to local database 411. Program 120 then proceeds on to person identification at 520 as described earlier.

If no match is found in public databases 413 at 516, then program 120 detects a security threat at 532 and initiates door locking at 534 and sends an alert, such as to the resident and a private security provider or local police at 536.

Figure 2:
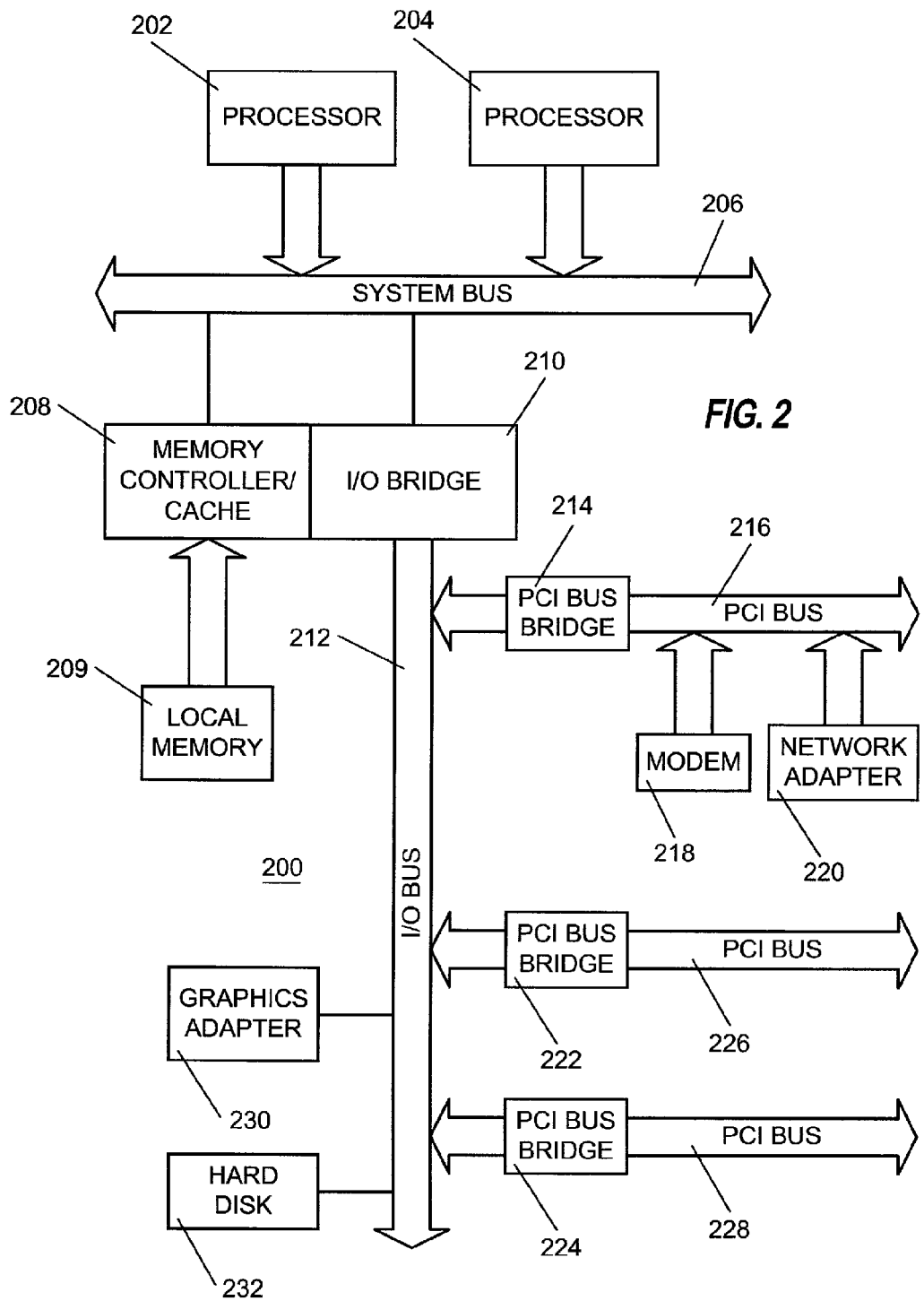
FIG. 2 is a block diagram of a data processing system that may be implemented as a server in which embodiments of the invention may be implemented.

Referring to FIG. 2, a block diagram of a data processing system that may be implemented as a server, such as server 104 in FIG. 1, is depicted in accordance with embodiments of the invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to embodiments of the invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
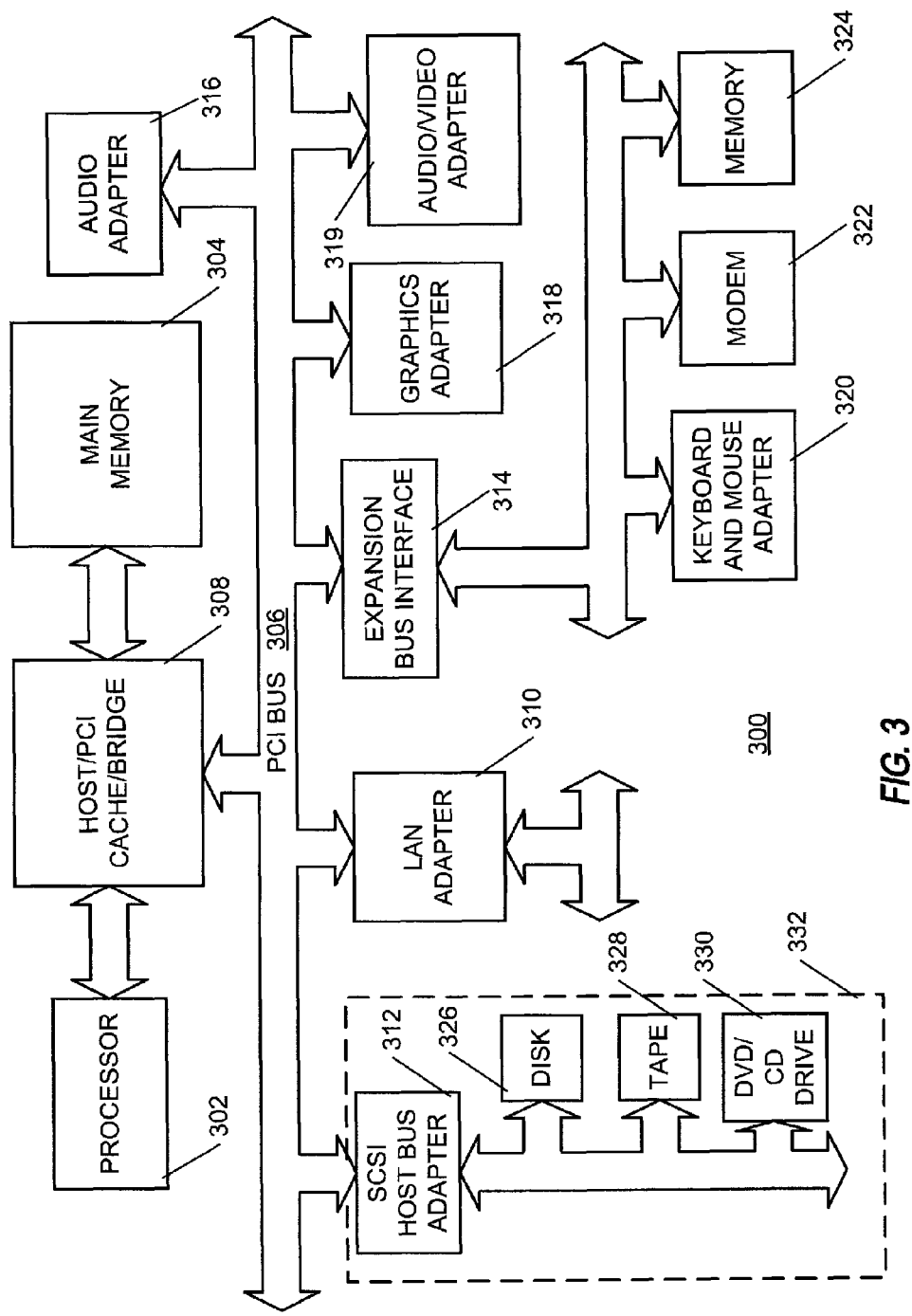
FIG. 3 is a block diagram illustrating a data processing system in which embodiments of the invention may be implemented.

With reference now to FIG. 3, a block diagram illustrating a data processing system is depicted in which embodiments of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as a Windows operating system, which is available from Microsoft Corporation. ("Windows" is a trademark of Microsoft Corporation.) An object oriented programming system such as Java may run in conjunction with the operating system and provide calls to the operating system from Java programs or programs executing on data processing system 300. ("Java" is a trademark of Sun Microsystems, Inc.) Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of embodiments of the invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, embodiments of the invention may reside on any data storage medium (i.e., floppy disk, compact disk, hard disk, tape, ROM, RAM, etc.) used by a computer system. (The terms "computer," "system," "computer system," and "data processing system" and are used interchangeably herein.

As will be appreciated by one skilled in the art, aspects of embodiments of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

This invention creates a unique system based on rules and roles applied to smart homes, a concept that has not been yet explored in this field. The device can be used by smart homes of the future, although the authors believe this will be more broadly used at first by entities such as hotels and other lodging facilities as program 120 is naturally connected to informational databases from government authority. This of course increases the level of safety these businesses can advertise to their consumers, especially for hotels who usually host foreign tourists.

Embodiments of the present invention provide many advantages. For example, they help avoid the following:

missing an important mail package that needs a signature in order to be delivered, so that the recipient does not need to head to the post office in-person later to retrieve it. (It can be particularly frustrating to miss a delivery just because the recipient left home for 10 minutes to go to the market nearby to buy a grocery item missing for lunch or dinner!)

worrying about whether the courier or postal carrier who asks for a signature is truly who they say they are, or whether the pizza or drugstore delivery person is authentic.

wondering who is at the door when someone rings the doorbell.

revealing to people passing by on the street that a residence is temporarily vacant, such as by leaving a notice stating that the resident is travelling, so that mail should be delivered next door.

Herein above, or in the following claims, the term "comprises" is synonymous with "includes." The use of terminology such as "X comprises A, B and C" is not intended to imply that A, B and C are necessarily the only components or most important components of X.

Unless clearly and explicitly stated, the claims that follow are not necessarily intended to imply any particular sequence of actions. The inclusion of labels, such as a), b), c) etc., for portions of the claims does not, by itself, imply any particular sequence, but rather is merely to facilitate reference to the portions.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. A method for managing an entryway for a building, the method comprising:
    accessing, by a computer system, identity data providing unique biometric identifications and associated names for respective people, so that different persons are identifiable by biometric data received from the respective different persons;
    storing roles and associating ones of the roles with ones of the people;
    storing rules, wherein each rule is configured to define one of the roles or people and define a condition and an action;
    receiving biometric data for a person at the entryway, by the computer system from a device for receiving biometric data, wherein the device is located at the entryway;
    identifying a named person indicated for the received biometric data by the identity data accessed by the computer system, wherein one of the defined roles is associated with the identified person;
    selecting, by the computer system, an announcement rule corresponding to the defined role for the identified person, wherein the announcement rule's action includes audibly announcing predefined instructions; and
    performing, by the computer system, the defined action for the selected announcement rule when a current condition satisfies the defined condition for the selected announcement rule, wherein performing the defined action for the selected announcement rule includes the computer system transmitting the predefined instructions to an audio speaker device at the entryway, wherein the selecting includes selecting different announcement rules having different predefined instructions for announcement for different identifiable persons who have different ones of the stored roles.

2. The method of claim 1, wherein storing a rule comprises storing a rule configured to define that presence of a person in the building is a condition for the rule and wherein the method further comprises:
    detecting whether a person is present in the building responsive to a sensor in the building, wherein the person detected by the sensor in the building is at a different location than the person who is located at the entryway.

3. The method of claim 1, wherein storing a rule comprises storing a rule configured to define at least a first condition that determines when the rule is active and a second condition that determines when the rule is invoked when the rule is active.

4. The method of claim 1, wherein storing a rule comprises storing a rule configured to be active by default and to be inactive only when configured with a non-default condition.

5. The method of claim 1, wherein accessing identity data providing unique biometric identifications and associated names for respective people comprises:
    accessing, by the computer system via a network, a database of a service provider defining names, biometric data and roles for respective people acting as agents of the service provider.

6. The method of claim 1, wherein the identity data providing unique biometric identifications and associated names for respective people comprises local identity data and remote identity data, wherein the computer system accesses the identity data responsive to the computer system receiving biometric data for a person from the device at the entryway, and wherein for identifying a named person indicated for the received biometric data the computer system accesses the remote identity data when the local identity data does not identify a named person for the received biometric data.

7. A system for managing an entryway for a building, comprising:
    at least one processor; and
    a computer-readable storage media connected to the at least one computing processor, wherein the computer-readable storage media has stored thereon a program for a rule-and-role-based smart doorbell program controlling the at least one processor, and wherein the at least one processor is operative with the program to execute the program to:
    access, by the system, identity data providing unique biometric identifications and associated names for respective people, so that different persons are identifiable by biometric data received from the respective different persons;
    store roles and associating ones of the roles with ones of the people;
    store rules, wherein each rule is configured to define one of the roles or people and define a condition and an action;
    receive biometric data for a person at the entryway, by the system from a device for receiving biometric data, wherein the device is located at the entryway;
    identify a named person indicated for the received biometric data by the identity data accessed by the system, wherein one of the defined roles is associated with the identified person;
    select, by the system, an announcement rule corresponding to the defined role for the identified person, wherein the announcement rule's action includes audibly announcing predefined instructions; and
    perform, by the system, the defined action for the selected announcement rule when a current condition satisfies the defined condition for the selected announcement rule, wherein performing the defined action for the selected announcement rule includes the computer system transmitting the predefined instructions to an audio speaker device at the entryway, wherein the selecting includes selecting different announcement rules having different predefined instructions for announcement for different identifiable persons who have different ones of the stored roles.

8. The system of claim 7, wherein storing a rule comprises storing a rule configured to define that presence of a person in the building is a condition for the rule and wherein the at least one processor is operative with the program to execute the program to:
    detect whether a person is present in the building responsive to a sensor in the building, wherein the person detected by the sensor in the building is at a different location than the person who is located at the entryway.

9. The system of claim 7, wherein storing a rule comprises storing a rule configured to define at least a first condition that determines when the rule is active and a second condition that determines when the rule is invoked when the rule is active.

10. The system of claim 7, wherein accessing identity data providing unique biometric identifications and associated names for respective people comprises:

accessing, by the system via a network, a database of a service provider defining names, biometric data and roles for respective people acting as agents of the service provider.

11. The system of claim 7, wherein the identity data providing unique biometric identifications and associated names for respective people comprises local identity data and remote identity data, wherein the system accesses the identity data responsive to the system receiving biometric data for a person from the device at the entryway, and wherein for identifying a named person indicated for the received biometric data the system accesses the remote identity data when the local identity data does not identify a named person for the received biometric data.

12. A computer program product for managing an entryway for a building, wherein the computer program product is encoded on a non-transitory computer readable medium, the computer program product comprising:

a computer-readable storage medium; and computer-readable program code embodied in the computer-readable storage medium, wherein the computer-readable program code is configured to cause a computer system to:

access identity data providing unique biometric identifications and associated names for respective people, so that different persons are identifiable by biometric data received from the respective different persons;

store roles and associating ones of the roles with ones of the people;

store rules, wherein each rule is configured to define one of the roles or people and define a condition and an action;

receive biometric data for a person at the entryway, by the computer system from a device for receiving biometric data, wherein the device is located at the entryway;

identify a named person indicated for the received biometric data by the identity data accessed by the computer system, wherein one of the defined roles is associated with the identified person;

select, by the computer system, an announcement rule corresponding to the defined role for the identified person, wherein the announcement rule's action includes audibly announcing predefined instructions; and perform, by the computer system, the defined action for the selected announcement rule when a current condition satisfies the defined condition for the selected announcement rule, wherein performing the defined action for the selected announcement rule includes the computer system transmitting the predefined instructions to an audio speaker device at the entryway, wherein the selecting includes selecting different announcement rules having different predefined instructions for announcement for different identifiable persons who have different ones of the stored roles.

13. The computer program product of claim 12, storing a rule comprises storing a rule configured to define that presence of a person in the building is a condition for the rule and wherein the computer-readable program code is configured to cause the computer system to:

detect whether a person is present in the building responsive to a sensor in the building, wherein the person detected by the sensor in the building is at a different location than the person who is located at the entryway.

14. The computer program product of claim 12, wherein storing a rule comprises storing a rule configured to define at least a first condition that determines when the rule is active and a second condition that determines when the rule is invoked when the rule is active.

15. The computer program product of claim 12, wherein storing a rule comprises storing a rule configured to be active by default and to be inactive only when configured with a non-default condition.

16. The computer program product of claim 12, wherein accessing the identity data providing unique biometric identifications and associated names for respective people comprises accessing a database of a service provider defining names, biometric data and roles for respective people acting as agents of the service provider.

17. The computer program product of claim 12, wherein the identity data providing unique biometric identifications and associated names for respective people comprises local identity data and remote identity data, wherein accessing the identity data is responsive to the system receiving biometric data for a person from the device at the entryway, and wherein for identifying a named person indicated for the received biometric data the computer-readable program code is configured to cause the computer system to access the remote identity data when the local identity data does not identify a named person for the received biometric data.

* * * * *